United States Patent [19]

Urushiyama et al.

[11] 4,092,017
[45] May 30, 1978

[54] PNEUMATIC SPRING DEVICE

[75] Inventors: Goro Urushiyama, Ooi; Noriyuki Takahashi, Tokyo, both of Japan

[73] Assignee: Honda Giken Kogyo Kabushiki Kaisha, Tokyo, Japan

[21] Appl. No.: 803,286

[22] Filed: June 3, 1977

[30] Foreign Application Priority Data

June 10, 1976 Japan .................................. 51-68006

[51] Int. Cl.² .............................................. F16F 9/08
[52] U.S. Cl. ...................................... 267/65 B; 92/94; 138/30; 220/85 B; 222/386.5; 280/708
[58] Field of Search ........................... 267/64 R, 65 B; 220/4 B, 85 B; 280/708; 138/30; 92/94, 103 R, 134, 143; 222/386.5

[56] References Cited

U.S. PATENT DOCUMENTS

| 2,804,884 | 9/1957 | Knox | 138/30 |
| 3,788,627 | 1/1974 | Wieland | 267/65 B X |

FOREIGN PATENT DOCUMENTS 226,361  1/1969  U.S.S.R. .................................. 138/30

Primary Examiner—George E. A. Halvosa
Attorney, Agent, or Firm—Haseltine, Lake & Waters

[57] ABSTRACT

A diaphragm arranged in a rigid casing to define therein a chamber to be filled with a mass of gaseous spring medium and another chamber to be held under oil pressure load is normally bulged into the oil chamber and formed on both surfaces thereof with dense clusters of elastic piles or projections which are compressed against each other only when the diaphragm is displaced from its neutral position to the load side as the load is reduced. Such displacement of the diaphragm is resisted by the elastic projections so as to increase the spring constant of the device in the lower load region and, with the device, used as a spring for automotive suspension, the pitching and rolling movements of the vehicle body are minimized.

3 Claims, 5 Drawing Figures

PNEUMATIC SPRING DEVICE

BACKGROUND AND SUMMARY OF THE INVENTION

This invention relates to pneumatic spring devices and more particularly to those of the type including a rigid casing defining a cavity therein and a diaphragm member arranged in the casing to divide the cavity into two chambers, including a gaseous fluid chamber filled with a mass of gaseous spring fluid such as air sealed therein and an oil chamber to be held under oil pressure load.

Conventional forms of such type of spring device have characteristically exhibited a spring constant which increases with increase in amount of load applied to the device over the whole working range thereof, as indicated by the line A in FIG. 5 of the accompanying drawings. In use of the spring device in an automotive suspension system, such spring characteristic is advantageous in that it enables the device to support a heavier load efficiently without impairing riding comfort of the vehicle. However, in the lighter load region, where the spring constant is reduced to an extreme extent, vertical displacement of the vehicle body for any load change is substantially increased and this obviously involves the disadvantage that the vehicle body is subjected to much increased pitching and rolling movements in such load region. In contrast, the line B in FIG. 5 represents a spring characteristic generally required of springs for automotive suspension. In other words, a suspension spring should preferably exhibit a performance characteristic like that of a conventional device in that portion of working range which lies above a certain intermediate load point N and have a spring constant which increases with reduction in load in the load region lower than the point N.

Accordingly, the present invention has for its object the provision of a novel pneumatic spring device of the type described which is adapted to meet the performance requirements described above and simple in construction.

The above and other objects and advantages of the present invention will become apparent from the following detailed description of a few preferred embodiments of the invention as illustrated in the accompanying drawings.

DESCRIPTION OF THE PREFERRED EMBODIMENTS

Figure 1:
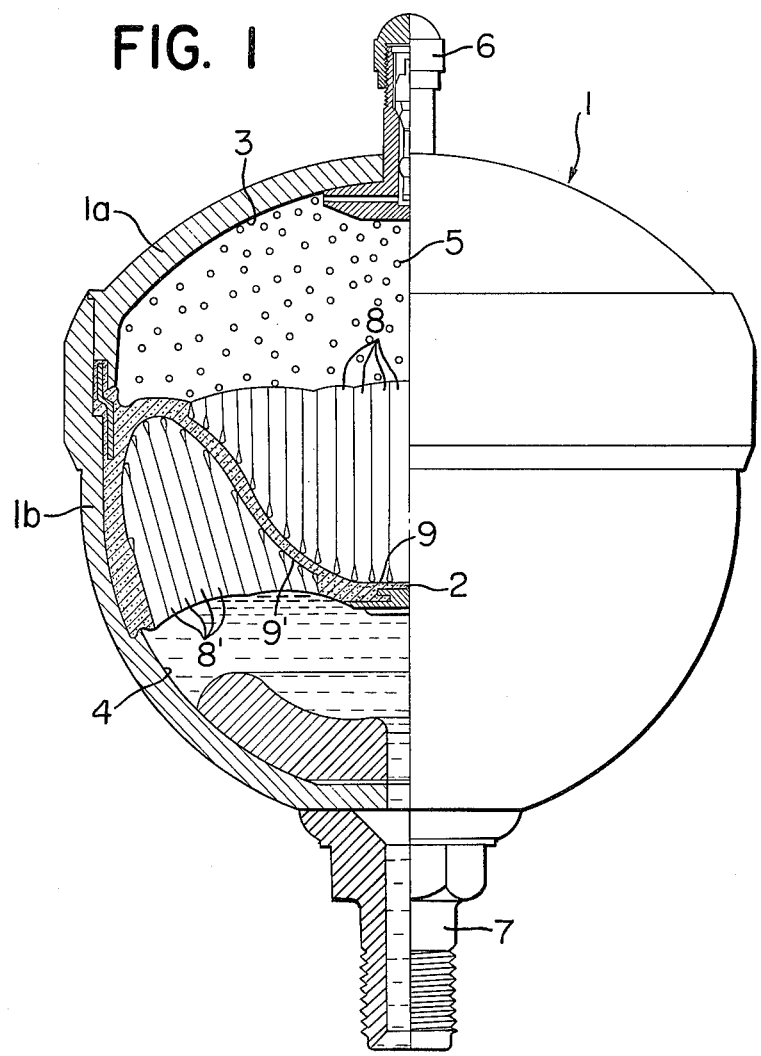
FIG. 1 is an elevational view, partly in axial cross section, of a preferred embodiment of the present invention.

Referring to the drawings and first to FIG. 1, which illustrates a preferred form of pneumatic spring device embodying the present invention, reference numeral 1 indicates a rigid casing which is comprised of a pair of upper and lower cup-shaped sections 1a and 1b jointed together to define a hollow cavity of substantially spherical shape. Arranged in the casing 1 is a diaphragm member 2 of elastic material such as rubber which is clamped securely around the periphery thereof between the casing sections 1a and 1b to divide the cavity or hollow space in the casing 1 into two chambers, that is, an upper chamber 3 and a lower chamber 4. A mass of high-pressure gaseous fluid such as air, 5, is fed into the upper chamber 3 through an inlet valve 6 provided at the top thereof and sealed therein to serve as a spring medium of the device. The lower chamber 4 is connected through a pipe joint 7, fitted to the bottom thereof, to a load unit such as an oil-hydraulic shock absorber for automotive use and is thus held under oil pressure load.

As illustrated, the diaphragm member 2 is normally bulged in its central region downwardly into the lower, oil chamber 4 and is provided on both upper and lower surfaces thereof with a large number of projections 8 or 8' of elastic material formed integral with the diaphragm 2 in dense clusters. As shown, the elastic projections 8, formed on the upper surface of the diaphragm 2, are normaly held in closely adjacent relation to each other so as to fill the cup-shaped recess 9 defined on the diaphragm surface. Similarly, the elastic projections 8', formed on the lower surface of diaphragm 2, are normally held in closely adjacent relation to each other so as to fill the annular space 9' defined between the downward bulge of diaphragm 2 and the peripheral portion thereof secured to the inner wall surface of the lower casing half 1b.

Figure 4:
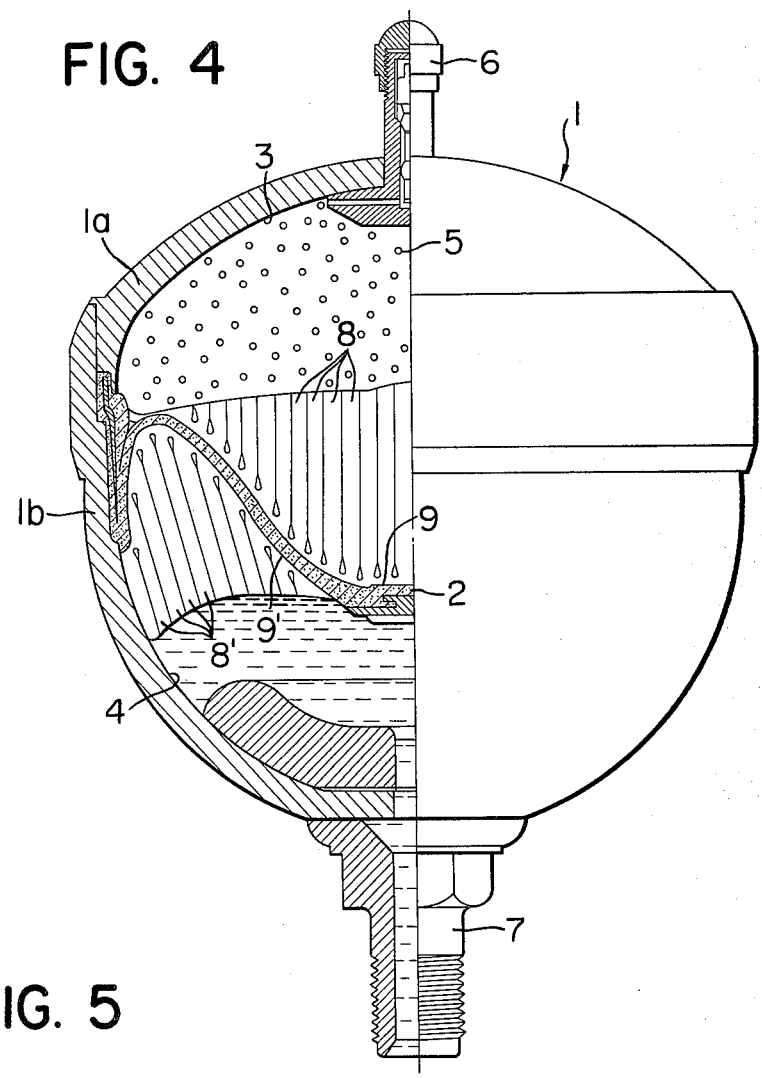
FIG. 4 is a view similar to FIG. 1, showing another preferred embodiment of the present invention.

Though the elastic projections 8 and 8' in this embodiment are formed integral with the diaphragm member 2, as described above, they may alternatively be formed by molding separately from the diaphragm 2 and adhesively secured thereto as in another embodiment shown in FIG. 4.

Description will next be made of the operation of the device of the present invention in connection with the embodiment shown in FIG. 1 as the two embodiments shown act in quite the same manner in operation.

Figure 5:
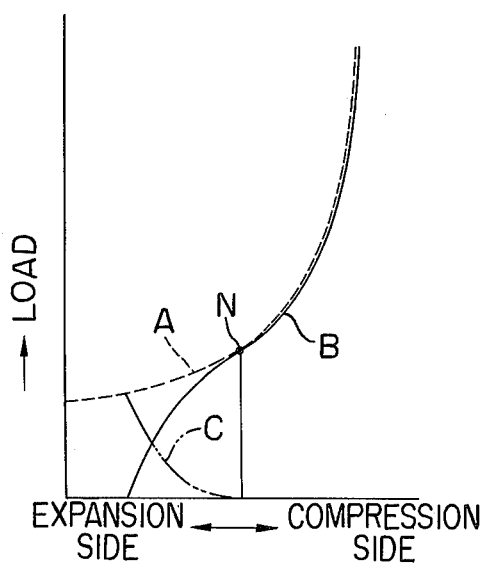
FIG. 5 is a graphic diagram illustrating spring characteristics of a typical conventional device and the device of the present invention, as indicated by the lines A and B, respectively.

In FIG. 1, the device is shown with the diaphgram 2 held in its neutral position corresponding to the point N in the diagram of FIG. 5, in which the abscissa represents volume of the gaseous spring medium held in the upper chamber, the ordinate representing load applied to the device. In this position of the diaphragm 2, it is to be noted that the elastic projections 8 and 8', clustering on the respective surfaces of the diaphragm, are not in any state compressed against each other but are in a free state just contacting each other.

Figure 2:
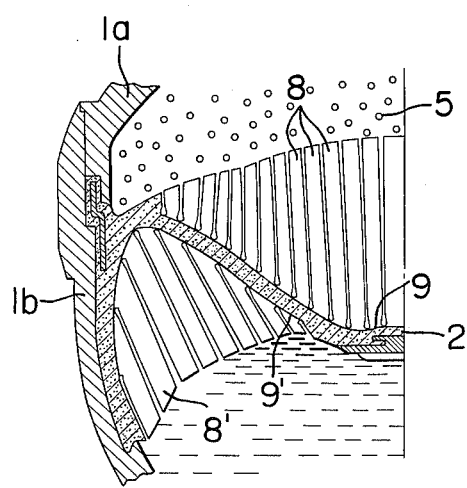
FIG. 2 is a fragmentary cross-sectional view showing the device in an operative state under heavy load.

Now, suppose that oil pressure in the lower, oil chamber 4 is raised with load increase. Then, the diaphragm 2 under the oil pressure is moved upward to compress the mass of gaseous spring fluid 5 held in the upper chamber 3. It will be recognized that, with such rising movement of diaphragm 2, the downward bulge of the diaphragm or its curvature is reduced and, in respective sets of elastic projections 8 and 8' on the diaphragm are spaced apart from each other, as shown in FIG. 2, allowing the diaphragm to rise freely without any restraint from the sets of elastic projections. This means that the gaseous spring medium 5 is only compressed so that its pressure is held in balance with the rising oil pressure in the lower chamber 4 and thus the spring characteristic of the device in the higher load region is quite the same as that of the conventional device, following the line B in FIG. 5 above the intermediate or neutral point N.

Figure 3:
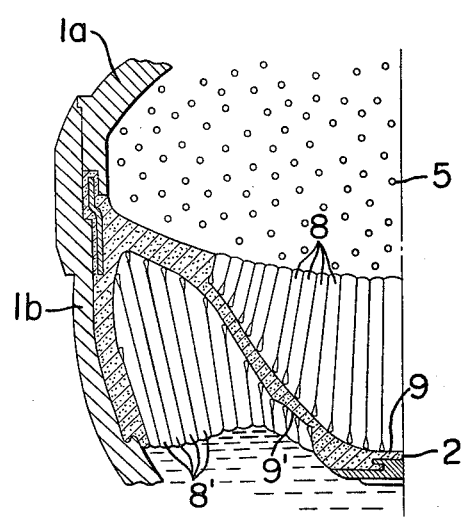
FIG. 3 is a view similar to FIG. 2, showing the device in operation under light load.

Next, suppose that the diaphragm 2 is again in its neutral position as shown in FIG. 1 and the load is reduced, causing decrease in oil pressure in the lower chamber 4. Then, the gaseous spring medium in the upper chamber 3 expands displacing the diaphragm 2 downward. With the downward displacement, the diaphragm 2 increases in curvature so that the elastic projections 8 and 8' in the respective sets formed on the upper and lower surfaces of diaphragm 2 are compressed against each other, as shown in FIG. 3, thus resisting the downward movement of the diaphragm. The force of such resistance increases as the diaphragm descends. The expanding power of spring medium 5 is partly taken up by such resistance of elastic projections 8 and 8', the remaining power portion acting in balance with the oil pressure in the lower chamber 4. Accordingly, the rate of expansion of gaseous spring medium 5 is reduced as the load decreases, as shown in FIG. 5 by the line B in the region below the neutral point N. In other words, in the lower load region, the spring constant of the device increases as the load applied thereto decreases, as indicated by the line C in the diagram of FIG. 5.

To summarize, according to the present invention, a multitude of elastic projections are formed in dense clusters on the opposite surfaces of the diaphragm member, which is normally bulged on the load side thereof into the oil chamber, and, only when the diaphragm is displaced from its neutral position into the oil chamber, are compressed against each other to resist such displacement of the diaphragm. It will be appreciated, therefore, that with the device of the present invention, there is obtained a highly desirable spring characteristic that, in the lower load region, the spring constant increases with reduction in load applied to the device while, in the higher load region, the inherent mode of spring performance of the diaphragm arrangement is maintained without any impairment. In addition, the device of the present invention, basically of conventional structure, only including improvements in the diaphragm member, is extremely simple in construction and arrangement.

Though only a few preferred embodiments of the present invention have been shown and described, it will be apparent to those skilled in the art that various changes and modifications may be made therein without departing from the spirit of the invention or the scope of the appended claims.

What is claimed is:

1. A pneumatic spring device comprising a rigid casing defining a cavity therein, a diaphragm member arranged in said casing to divide said cavity into two fluid chambers, including a gaseous-fluid chamber having a mass of gaseous spring medium sealed therein and an oil chamber to be held under oil pressure load, said diaphragm member being formed normally to bulge into said oil chamber, and a multitude of projections of elastic material formed in dense clusters on both surfaces of said diaphragm member so as to be compressed against each other thereby to resist displacement of said diaphragm member only when the latter is displaced from a predetermined neutral position into said oil chamber.

2. A pneumatic spring device as set forth in claim 1, in which said elastic projections are formed integral with said diaphragm member.

3. A pneumatic spring device as set forth in claim 1, in which said elastic projections are adhesively secured onto said diaphragm member.

* * * * *